(12) United States Patent
Ding

(10) Patent No.: US 10,296,472 B2
(45) Date of Patent: May 21, 2019

(54) METHOD FOR SETTING UNIVERSAL SERIAL BUS (USB) INTERFACE OF ELECTRONIC DEVICE, AND ELECTRONIC DEVICE

(71) Applicants: Hisense Mobile Communications Technology Co., Ltd., Qingdao, Shandong (CN); Hisense USA Corporation, Suwanee, GA (US); Hisense International Co., Ltd., Qingdao, Shandong (CN)

(72) Inventor: Chao Ding, Shandong (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/990,122

(22) Filed: May 25, 2018

(65) Prior Publication Data
US 2018/0276148 A1 Sep. 27, 2018

Related U.S. Application Data

(63) Continuation of application No. 15/819,022, filed on Nov. 21, 2017, now Pat. No. 10,007,621, which is a
(Continued)

(30) Foreign Application Priority Data

Sep. 11, 2014 (CN) .......................... 2014 1 0461865

(51) Int. Cl.
*G06F 13/10* (2006.01)
*G06F 13/42* (2006.01)
(Continued)

(52) U.S. Cl.
CPC .......... *G06F 13/102* (2013.01); *G06F 13/385* (2013.01); *G06F 13/4068* (2013.01);
(Continued)

(58) Field of Classification Search
CPC .. G06F 13/102; G06F 13/385; G06F 13/4282; G06F 9/4411
See application file for complete search history.

(56) References Cited

U.S. PATENT DOCUMENTS

| 8,092,104 B2 | 1/2012 | Buzuev et al. |
| 8,412,959 B2 | 4/2013 | Nakayama |

(Continued)

FOREIGN PATENT DOCUMENTS

| CN | 101292224 | 10/2008 |
| CN | 101777032 | 7/2010 |

OTHER PUBLICATIONS

State Intellectual Property Office of People's Republic of China, "First Office Action and Search Report for CN Application No. 201410461865.8" and English translation, China, dated Sep. 1, 2016.
(Continued)

*Primary Examiner* — Brian T Misiura
(74) *Attorney, Agent, or Firm* — Hauptman Ham, LLP

(57) ABSTRACT

A method includes processing a plurality of descriptors received from an electronic device. Each descriptor corresponds to a function of the electronic device. The processing includes determining a virtual function device corresponding to execution of at least one function based on a successful matching of one or more of the received descriptors with one or more driver files corresponding to at least one of the plurality of functions. The method also includes communicating an operating command to the virtual function device corresponding to execution of the at least one function based on an indication that the at least one function is to be
(Continued)

executed. The operating command causes the virtual function device corresponding to execution of the at least one function to be operated on the electronic device. Two or more functions of the plurality of functions associated with different resources of the electronic device are selectable for execution.

12 Claims, 5 Drawing Sheets

Related U.S. Application Data continuation of application No. 14/603,867, filed on Jan. 23, 2015, now Pat. No. 9,852,085.

(51) Int. Cl.
*G06F 13/40* (2006.01)
*G06F 13/38* (2006.01)

(52) U.S. Cl.
CPC ...... *G06F 13/4282* (2013.01); *G06F 13/4295* (2013.01); *H05K 999/00* (2013.01); *G06F 2213/0042* (2013.01); *G06F 2213/3812* (2013.01)

(56) References Cited

U.S. PATENT DOCUMENTS

| | | | |
|---|---|---|---|
| 8,484,394 B2 | 7/2013 | Hubo et al. | |
| 8,850,082 B2 | 9/2014 | Malamant et al. | |
| 9,021,579 B2 | 4/2015 | Shih | |
| 9,208,118 B2 | 12/2015 | Lee et al. | |
| 9,336,022 B2 | 5/2016 | Yang | |
| 9,779,124 B2 | 10/2017 | Seo | |
| 9,852,085 B2 | 12/2017 | Ding | |
| 2008/0153548 A1 | 6/2008 | Shin | |
| 2009/0083765 A1 | 3/2009 | Davis | |
| 2009/0300239 A1 | 12/2009 | Hubo | |
| 2010/0082869 A1 | 4/2010 | Lloyd | |
| 2010/0180064 A1 | 7/2010 | Han | |
| 2013/0042028 A1 | 2/2013 | Yang | |
| 2013/0238820 A1 | 9/2013 | Yang | |
| 2015/0339242 A1 | 11/2015 | Huang | |
| 2016/0077982 A1 | 3/2016 | Ding | |
| 2016/0246957 A1 | 8/2016 | Shen | |
| 2017/0214961 A1 | 7/2017 | Oak | |
| 2018/0004277 A1 | 1/2018 | Matsui | |
| 2018/0032350 A1 | 2/2018 | Lee | |
| 2018/0089112 A1 | 3/2018 | Ding | |

OTHER PUBLICATIONS

State Intellectual Property Office of People's Republic of China, "Second Office Action for CN Application No. 201410461865.8" and English translation, China, dated Mar. 30, 2017.

"Enhanced Host Controller Interface Specification for Universal Serial Bus"—Dated Mar. 12, 2002, 155 pages.

"Hardware/Software Tradeoffs: A General Design Principle"—Dated Jan. 25, 1985; 3 pages.

METHOD FOR SETTING UNIVERSAL SERIAL BUS (USB) INTERFACE OF ELECTRONIC DEVICE, AND ELECTRONIC DEVICE

CROSS-REFERENCE TO RELATED APPLICATIONS

This non-provisional application is a continuation of U.S. application Ser. No. 15/819,022, filed Nov. 21, 2017, which is a continuation application of U.S. application Ser. No. 14/603,867, filed Jan. 23, 2015, now U.S. Pat. No. 9,852,085, issued Dec. 26, 2017, which itself claims the priority to, under 35 U.S.C. § 119(a), Chinese Patent Application No. 201410461865.8, filed on Sep. 11, 2014, in the State Intellectual Property Office of P.R. China. The entire contents of the above identified applications are incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present disclosure relates to electronic technology, and more particularly, to methods of setting a universal serial bus (USB) interface of an electronic device.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, the group of users for Android smartphones is increasing. It has become an issue of concern for people as to how to allow users to operate the Android smartphones more conveniently through Personal Computers (PCs).

Due to the open nature of the Android system, more and more mobile phone assistants for the PCs are available. The mobile phone assistants may be installed in the PCs to implement operations on mobile phones through universal serial bus (USB) interfaces.

Therefore, a heretofore unaddressed need exists in the art to address the aforementioned deficiencies and inadequacies.

SUMMARY OF THE INVENTION

One aspect of the present disclosure relates to a method comprising processing, by a controller, a plurality of descriptors received from an electronic device communicatively coupled with the controller. Each descriptor of the plurality of descriptors corresponds to a function of a plurality of functions of the electronic device. The processing comprises determining a virtual function device corresponding to execution of at least one function of the plurality of functions based on a successful matching of one or more of the received descriptors with one or more driver files corresponding to at least one function of the plurality of functions. The method also comprises communicating an operating command to the virtual function device corresponding to execution of the at least one function based on an indication that the at least one function is to be executed. The operating command causes the virtual function device corresponding to execution of the at least one function to be operated on the electronic device. Two or more functions of the plurality of functions associated with different resources of the electronic device are selectable for execution.

In certain exemplary embodiments, the method further includes: after the controller detects the USB interface being connected to the electronic device, sending, by the controller, a command of obtaining the descriptors to the electronic device through the USB interface.

In certain exemplary embodiments, the method further includes: after the controller detects the USB interface being connected to the electronic device, determining, by the controller, that the electronic device is in a non-charging mode according to mode information received from the electronic device.

Another aspect of the present disclosure relates to an apparatus, comprising a processor and a non-transitory computer readable medium having computer-executable program code stored thereon that, when executed by the processor, causes the apparatus to process a plurality of descriptors received from an electronic device communicatively coupled with the apparatus. Each descriptor of the plurality of descriptors corresponds to a function of a plurality of functions of the electronic device. The processing comprises determining a virtual function device corresponding to execution of at least one function of the plurality of functions based on a successful matching of one or more of the received descriptors with one or more driver files corresponding to at least one function of the plurality of functions. The apparatus is also caused to communicate an operating command to the virtual function device corresponding to execution of the at least one function based on an indication that the at least one function is to be executed. The operating command causes the virtual function device corresponding to execution of the at least one function to be operated on the electronic device. Two or more functions of the plurality of functions associated with different resources of the electronic device are selectable for execution.

In certain exemplary embodiments, the method further includes: after the electronic device detects the connection to the apparatus through the USB interface, determining, by the electronic device, corresponding mode information according to a mode selected by the user, and sending the mode information determined to the apparatus, wherein the mode information is configured to indicate whether the electronic device is in a non-charging mode.

In certain exemplary embodiments, the description information includes at least one of the following information: device description information, configuration description information, interface description information, and endpoint description information.

A further aspect of the present disclosure relates to method comprising displaying, by an electronic device, a plurality of functions of the electronic device. The displaying is based on a determination that the electronic device is communicatively coupled with a controller. At least one function of the plurality of functions corresponds to one virtual interface of a plurality of virtual interfaces. A first function and a second function of the plurality of functions are associated with a first resource of the electronic device. A third function of the plurality of functions is associated with a second resource of the electronic device different from the first resource. The method also comprises communicating a plurality of descriptors to the controller, wherein each descriptor of the plurality of descriptors corresponds to a function of the plurality of functions of the electronic device. The method further comprises identifying at least one of the first function or the second function is to be executed based on a first indication. The method additionally comprises identifying the third function to be executed based on a second indication different from the first indication.

In certain exemplary embodiments, the first function is a media transfer protocol (MTP) function, the second function is a picture transfer protocol (PTP) function, and the third function is an Android Development Bridge (ADB) function.

These and other aspects of the disclosure will become apparent from the following description of several exemplary embodiments taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
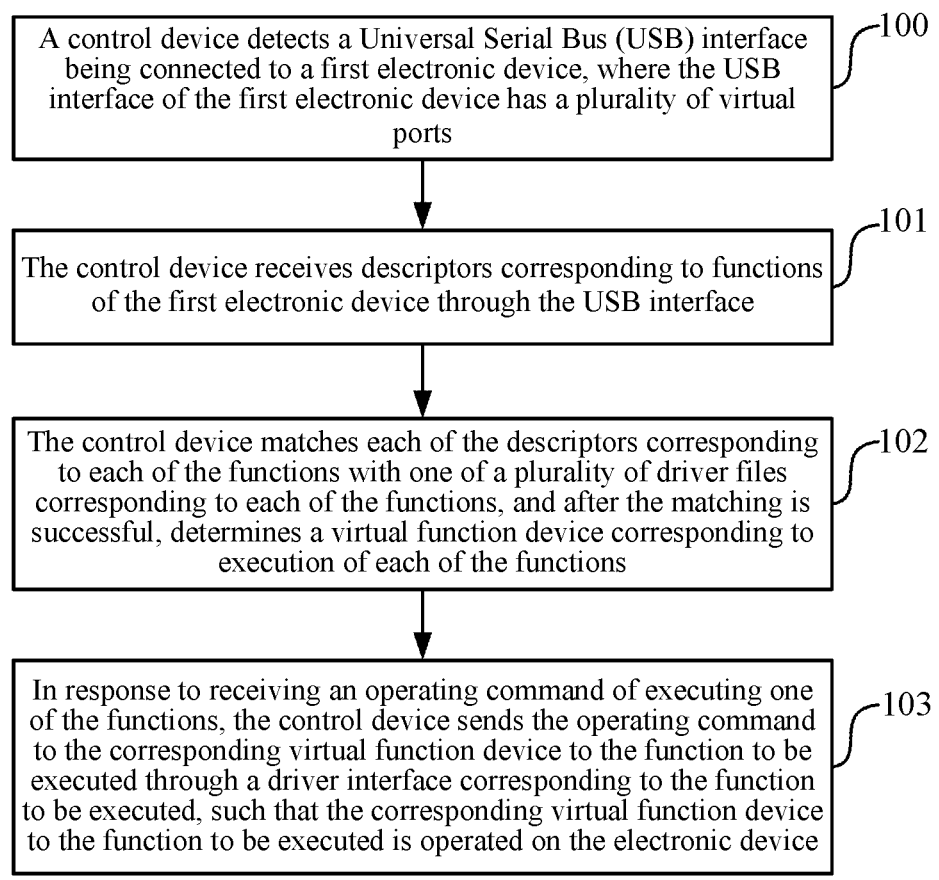
FIG. 1 shows a flowchart of a method for operating a first electronic device according to one exemplary embodiment of the present disclosure.

The disclosure will now be described hereinafter with reference to the accompanying drawings, in which several exemplary embodiments of the disclosure are shown. This disclosure may, however, be embodied in many different forms and should not be construed as limited to the exemplary embodiments set forth herein.

The terms used in this specification generally have their ordinary meanings in the art, within the context of the disclosure, and in the context where each term is used. Certain terms that are configured to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various exemplary embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the exemplary embodiments of the disclosure in conjunction with the accompanying drawings in FIGS. 1-6. It should be understood that exemplary embodiments described herein are merely used for explaining the disclosure, but are not intended to limit the disclosure. In accordance with the purposes of this disclosure, as embodied and broadly described herein, this disclosure, in certain aspects, relates to a beam shaping apparatus, a method of light beam shaping, and a reflector unit.

In one exemplary embodiment of the present disclosure, a control device detects a USB interface being connected to a first electronic device, where the USB interface of the first electronic device has a plurality of virtual ports. Then the control device receives description information corresponding to functions of the first electronic device through the USB interface. Then the control device matches each of the description information corresponding to each of the functions with one of a plurality of driver files corresponding to each of the functions, and after the matching is successful, determines a virtual function device corresponding to execution of each of the functions. Finally, in response to receiving an operating command for executing one of the functions, the control device sends the operating command to the corresponding virtual function device to the function to be executed through a driver interface corresponding to the function to be executed, such that the corresponding virtual function device to the function to be executed is operated on the electronic device.

In one exemplary embodiment of the present disclosure, after the first electronic device is connected to the control device through the USB interface, the first electronic device receives a command of obtaining description information sent by the control device. After receiving the command of obtaining the description information sent by the control device, the first electronic device displays a plurality of functions each corresponding to one of a plurality of virtual ports. Then the first electronic device generates corresponding description information according to a corresponding USB driver to each of the functions selected by a user. Then, the first electronic device sends the generated description information to the control device through the USB interface.

In certain exemplary embodiments, due to increasing the virtual ports of the USB interface of the first electronic device in such a technical solution, the control device may obtain description information corresponding to at least one function, allowing implementation for the control device to operate at least one function of peripheral devices.

In one exemplary embodiment of the present disclosure, the first electronic device may be a mobile phone, a tablet computer, an e-book reader, an MP4 player, or the like. The control device may be a PC or the like. The description information may be a descriptor.

The exemplary embodiments of the present disclosure may be further described below in detail with reference to the accompanying drawings of the specification.

FIG. 1 shows a flowchart of a method for operating a first electronic device according to one exemplary embodiment of the present disclosure. As shown in FIG. 1, the method includes:

Operation 100: A control device detects a USB interface being connected to the first electronic device, where the USB interface of the first electronic device has a plurality of virtual ports.

Operation 101: The control device receives descriptors corresponding to functions of the first electronic device through the USB interface.

Operation 102: The control device matches each of the descriptors corresponding to each of the functions with one of a plurality of driver files corresponding to each of the functions, and after the matching is successful, determines a virtual function device corresponding to execution of each of the functions.

Operation 103: In response to receiving an operating command of executing one of the functions, the control device sends the operating command to the corresponding virtual function device to the function to be executed through a driver interface corresponding to the function to be executed, such that the corresponding virtual function device to the function to be executed is operated on the electronic device.

In certain exemplary embodiments, the control device may be a device having a control function, such as a PC, and the first electronic device may be a smartphone or other smart devices having an operating system, such as an Android system.

In certain exemplary embodiments, the control device, after detecting the USB interface being connected to the first electronic device and before receiving at least one of the descriptors corresponding to at least one of the functions of the first electronic device through the USB interface, may further send a command of obtaining the descriptors to the first electronic device through the USB interface, such that the first electronic device may return the descriptors. The process of sending the command and receiving the descriptors may also be referred to as an enumeration process.

In one exemplary embodiment of the present invention, the USB descriptors may include one or more of a device descriptor, a configuration descriptor, an interface descriptor and an endpoint descriptor, which are respectively used for reporting USB device information, configuration information, interface information and endpoint information.

In one possible case, one exemplary embodiment of a descriptor is reported by a USB device to a PC when the PC enumerates the USB device. With the information included in the descriptor, the PC may understand the number of interfaces the USB device has, the number of corresponding functions the USB device provides, and the endpoint each of the interfaces utilizes. In this case, a PC driver can communicate with the USB device. Several examples of specific content of the device descriptor, the configuration descriptor, the interface descriptor and the endpoint descriptor are described below, which should not be construed to limit the present invention:

Device Descriptor 12 01 00 02 00 00 00 40 9B 10 30 91 FF FF 01 02 . . . @ . . . 0 . . .

03 01 bLength 0x12
bDescriptorType 0x01
bcdUSB 0x0200—Spec#=02.00
bDeviceClass 0x00—(Defined at Interface level)
bDeviceSubClass 0x00
bDeviceProtocol 0x00
bMaxPacketSize0 0x40—64 bytes
idVendor 0x109B
idProduct 0x9130
bcdDevice 0xFFFF—Device#=FF.FF
iManufacturer 0x01—Hisense
iProduct 0x02—Hisense
iSerialNumber 0x03—I632M
bNumConfigurations 0x01
Configuration Descriptor:
09 02 3E 00 02 01 00 80 FA . . . > . . .
bLength 0x09
bDescriptorType 0x02
wTotalLength 0x003E bNumInterfaces 0x02
bConfigurationValue 0x01
iConfiguration 0x00
bmAttributes 0x80—Self-powered=No, Remote Wakeup=No
MaxPower 0xFA—500 mA
Interface Descriptor:
09 04 00 00 03 FF FF 00 05
bLength 0x09
bDescriptorType 0x04
bInterfaceNumber 0x00
bAlternateSetting 0x00
bNumEndpoints 0x03
bInterfaceClass 0xFF—Vendor specific
bInterfaceSubClass 0xFF—Vendor specific
bInterfaceProtocol 0x00—Vendor specific
iInterface 0x05—MTP
Endpoint Descriptor:
07 05 81 02 00 02 00
bLength 0x07
bDescriptorType 0x05
bEndpointAddress 0x81—Endpoint#=1, Direction=IN
bmAttributes 0x02—Transfer Type=Bulk
wMaxPacketSize 0x0200—512 bytes
bInterval 0x00—Ignored
Endpoint Descriptor:
07 05 01 02 00 02 00
bLength 0x07
bDescriptorType 0x05
bEndpointAddress 0x01—Endpoint#=1, Direction=OUT
bmAttributes 0x02—Transfer Type=Bulk
wMaxPacketSize 0x0200—512 bytes
bInterval 0x00—Ignored
Endpoint Descriptor:
07 05 82 03 1C 00 06
bLength 0x07
bDescriptorType 0x05
bEndpointAddress 0x82—Endpoint#=2, Direction=IN
bmAttributes 0x03—Transfer Type=Interrupt
wMaxPacketSize 0x001C—28 bytes
bInterval 0x06—6 milliseconds
Interface Descriptor:
09 04 01 00 02FF 42 01 04 . . . B . . .
bLength 0x09
bDescriptorType 0x04
bInterfaceNumber 0x01
bAlternateSetting 0x00
bNumEndpoints 0x02
bInterfaceClass 0xFF—Vendor specific
bInterfaceSubClass 0x42—Vendor specific
bInterfaceProtocol 0x01—Vendor specific
iInterface 0x04—ADB Interface
Endpoint Descriptor:
07 05 02 02 00 02 00
bLength 0x07
bDescriptorType 0x05
bEndpointAddress 0x02—Endpoint#=2, Direction=OUT
bmAttributes 0x02—Transfer Type=Bulk
wMaxPacketSize 0x0200—512 bytes
bInterval 0x00—Ignored
Endpoint Descriptor:
07 05 83 02 00 02 00
bLength 0x07
bDescriptorType 0x05
bEndpointAddress 0x83—Endpoint#=3, Direction=IN
bmAttributes 0x02—Transfer Type=Bulk
wMaxPacketSize 0x0200—512 bytes
bInterval 0x00—Ignored In certain exemplary embodiments of the present disclosure, after the control device is connected to the first electronic device through the USB interface, an unknown virtual function device is displayed on the control device, and a message box is popped up on the first electronic device, such that a user may select the functions thereof in the message box according to needs. In certain exemplary embodiments, the selected functions cannot occupy the same mobile phone resource. For example, the media transfer protocol (MTP) and the picture transfer protocol (PTP) cannot be selected at the same time since MTP and PTP occupy the same storage resource of the first electronic device, and thus operations cannot be performed thereon simultaneously.

After selection of the functions, the control device performs the enumeration process. In other words, that is, the control device performs the process to send a command of obtaining the descriptors, and thereby obtaining the descriptors corresponding to the functions selected by the user.

In one exemplary embodiment of the present disclosure, with respect to one of the functions, a corresponding descriptor may include some or all of the following information: a device descriptor, a configuration descriptor, an interface descriptor and an endpoint descriptor.

After obtaining the descriptors corresponding to the functions selected by the user, the descriptor information corresponding to the functions will be matched with corresponding function driver files of the control device. For example, if MTP and Android Development Bridge (ADB) are selected, the descriptor information of the MTP function is matched with an MTP driver file of the control device, and the descriptor information of the ADB function is matched with an ADB driver file of the control device. Specifically, the matching process may be described using the ADB function as an example. After the descriptor information of the ADB function is obtained, the control device selects configuration information corresponding to the function in an ADB driver file, and matches the selected configuration information with the obtained descriptor information. If the matching is successful, one of a plurality of unknown virtual function devices displayed on the control device is selected, and the selected unknown virtual function device is configured according to the selected configuration information through a set configuration request, such that the configured virtual function device is taken as a virtual function device corresponding to execution of the function.

After a corresponding operating command is received, the operating command is delivered to a corresponding virtual drive device through a corresponding driver interface, thereby implementing the operation on the mobile phone, for example, a delete operation is performed on a video of the first electronic device through the MTP function, and when the control device receives an operating command of deleting a related video, the command is delivered to an MTP driver interface and then is delivered to an MTP device through the MTP driver interface, thereby implementing the operation of deleting a video from the first electronic device.

In one exemplary embodiment of the present disclosure, while the first electronic device is operated through the MTP function, the first electronic device can also be operated by using the ADB function or another function that does not occupy the same resource of the first electronic device with the MTP function.

In one exemplary embodiment of the present disclosure, after detecting the USB interface being connected to the first electronic device, the control device sends a command of obtaining the descriptors to the first electronic device through the USB interface. Further, after sending the command of obtaining the descriptors to the first electronic device, the control device receives the descriptors corresponding to at least one of the functions of the first electronic device through the USB interface.

In certain exemplary embodiments of the present disclosure, the command of obtaining the descriptors may be an existing command of getting one descriptor. However, in certain exemplary embodiments, there may be multiple descriptors, and the command may also be a new command.

For example, the control device may send a get device descriptor standard request to the first electronic device through an address 0 in order to obtain a device descriptor. Then the control device may send a get configuration request to the first electronic device in order to obtain a configuration descriptor.

After the control device is connected to the first electronic device through the USB interface, a message box may pop up on the first electronic device to require the user to select a function mode thereof. If the user selects a charging mode, it indicates that the user only requires charging of the first electronic device without the need to operate the first electronic device. In this case, the control device does not perform the enumeration process again. Alternatively, the control device needs to perform the enumeration process.

Therefore, the control device, after detecting the USB interface being connected to the first electronic device, may determine whether the first electronic device is in a non-charging mode. If the control device determines that the first electronic device is in the non-charging mode, the control device receives the descriptors corresponding to at least one of the functions of the first electronic device through the USB interface. In other words, when a function such as MTP, ADB or PTP is selected through the message box popped up at the first electronic device, such as a mobile phone, which is in the non-charging mode, the control device needs to perform the enumeration process. Thus, it is necessary to determine the selection mode of the first electronic device prior to the enumeration process.

In one exemplary embodiment of the present disclosure, the method further includes: after the control device detects the USB interface being connected to the first electronic device, if the control device determines that the first electronic device is in a charging mode according to the mode information received from the first electronic device, the control device skips the operation of receiving the descriptors corresponding to the functions of the first electronic device through the USB interface to directly perform a charging operation on the first electronic device.

If a charging mode is selected, the PC will directly charge the mobile phone, and skip the process that the control device receives the descriptors corresponding to the functions of the first electronic device through the USB interface, the subsequent processes of matching the descriptors corresponding to the functions with the driver files corresponding to the functions and determining a virtual function device, and the process of operating one or more functions of the first electronic device. Thus, the purpose of allowing the user to perform a charging operation on the mobile phone through the PC without installing a driver thereon may be achieved.

Figure 2:
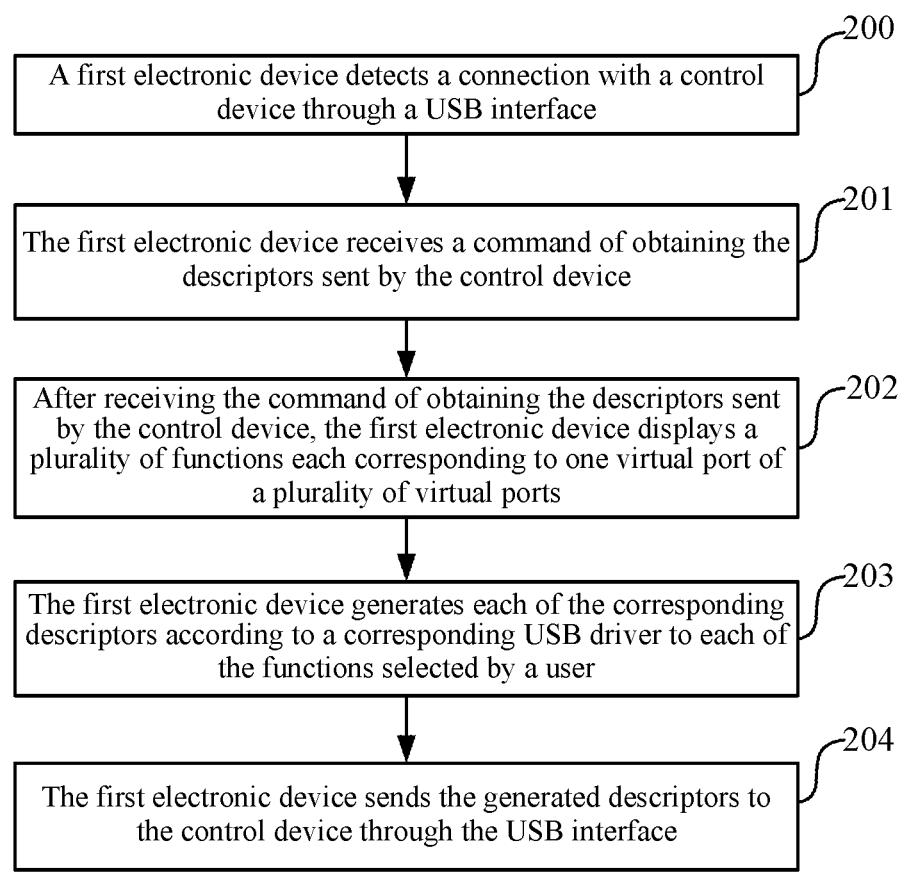
FIG. 2 shows a flowchart of a method for setting a USB interface according to one exemplary embodiment of the present disclosure.

FIG. 2 shows a flowchart of a method for setting a USB interface according to one exemplary embodiment of the present disclosure. As shown in FIG. 2, the method includes:

Operation 200: A first electronic device detects a connection with a control device through a USB interface.

Operation 201: The first electronic device receives a command of obtaining descriptors sent by the control device.

Operation 202: After receiving the command of obtaining descriptors sent by the control device, the first electronic device displays a plurality of functions each corresponding to one virtual port of a plurality of virtual ports.

Operation 203: The first electronic device generates each of the corresponding descriptors according to a corresponding USB driver to each of the functions selected by a user.

Operation 204: The first electronic device sends the generated descriptors to the control device through the USB interface.

In certain exemplary embodiments of the present disclosure, in a USB device, a virtual port interface is taken as a unit thereof. Thus, different functions correspond to different interfaces, where the different functions cannot occupy the same resource of a mobile phone. Thus, an operation of selecting at least one of functions in a message bar of the mobile phone may be implemented. For example, MTP may correspond to interface 0, and ADB may correspond to interface 1, such that the user may select both MTP and ADB functions at the same time or just one of them.

In one exemplary embodiment of the present disclosure, after the first electronic device detects the connection with the control device through the USB interface, the method further includes: the first electronic device determines corresponding mode information according to a mode selected by a user, and sends the determined mode information to the control device, where the mode information is configured to indicate whether the first electronic device is in a non-charging mode.

Figure 3:
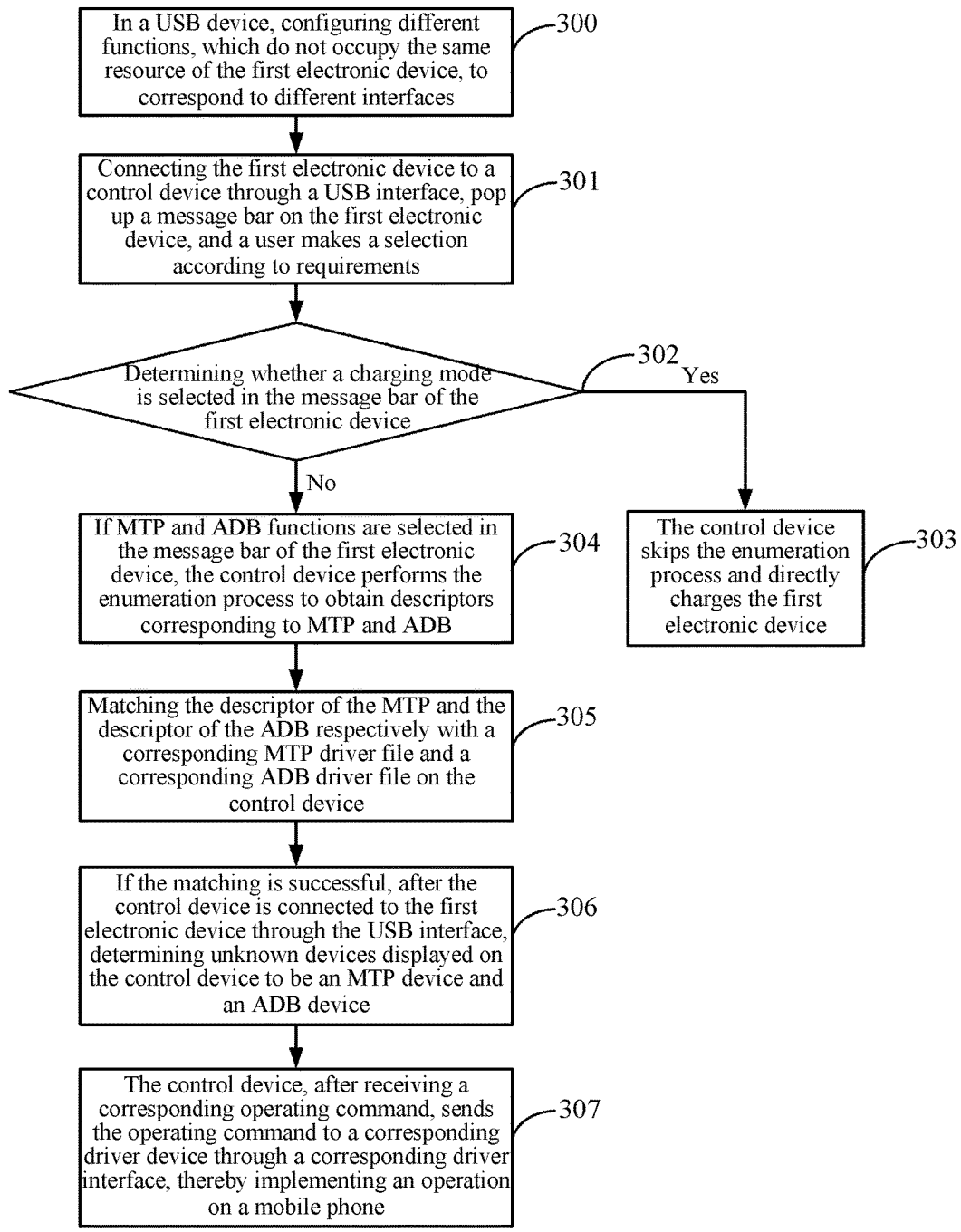
FIG. 3 shows a flowchart of a method for operating a first electronic device according to one exemplary embodiment of the present disclosure.

FIG. 3 shows a flowchart of a method for operating a first electronic device according to one exemplary embodiment of the present disclosure. As shown in FIG. 3, the method includes:

Operation 300: In a USB device, configuring different functions, which do not occupy the same resource of the first electronic device, to correspond to different interfaces.

Operation 301: Connecting the first electronic device to a control device through a USB interface, pop up a message bar on the first electronic device, and a user makes a selection according to requirements.

Operation 302: Determining whether a charging mode is selected in the message bar of the first electronic device. If so, the control device performs Operation 303; otherwise, the control device performs Operation 304.

Operation 303: The control device skips the enumeration process and directly charges the first electronic device; and the process ends.

Operation 304: If MTP and ADB functions are selected in the message bar of the first electronic device, the control device performs the enumeration process to obtain descriptors corresponding to MTP and ADB.

Operation 305: Matching the descriptor of the MTP and the descriptor of the ADB respectively with a corresponding MTP driver file and a corresponding ADB driver file on the control device.

Operation 306: If the matching is successful, after the control device is connected to the first electronic device through the USB interface, determining unknown devices displayed on the control device to be an MTP device and an ADB device.

Operation 307: The control device, after receiving a corresponding operating command, sends the operating command to a corresponding driver device through a corresponding driver interface, thereby implementing an operation on a mobile phone.

One exemplary embodiment of the present disclosure further provides an apparatus for operating a first electronic device. As the method corresponding to the apparatus for operating the first electronic device is the method for operating the first electronic device, the apparatus may be implemented with reference to the method as described above, and is thus not elaborated herein.

Figure 4:
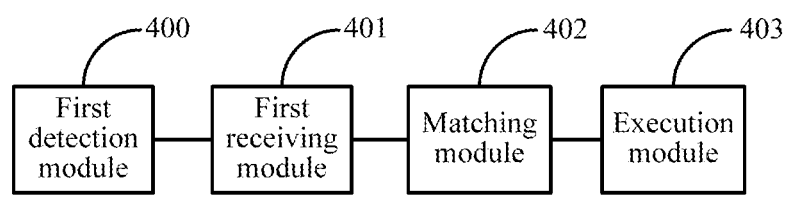
FIG. 4 schematically shows an apparatus for operating a first electronic device according to one exemplary embodiment of the present disclosure.

FIG. 4 schematically shows an apparatus for operating a first electronic device according to one exemplary embodiment of the present disclosure. As shown in FIG. 4, the apparatus for operating the first electronic device includes:

a first detection module 400, configured to detect a USB interface being connected to the first electronic device, where the USB interface of the first electronic device has a plurality of virtual ports;

a first receiving module 401, configured to receive descriptors corresponding to functions of the first electronic device through the USB interface;

a matching module 402, configured to match each of the descriptors corresponding to each of the functions with one of the driver files corresponding to each of the functions, and after the matching is successful, determining a virtual function device corresponding to execution of each of the functions; and an execution module 403, configured to, in response to receiving an operating command of executing one of the functions, sending the operating command to a virtual function device corresponding to a function to be executed through a driver interface corresponding to the function to be executed, such that the corresponding virtual function device to the function to be executed is operated on the electronic device.

In one exemplary embodiment of the present disclosure, the first detection module 400 is further configured to, after detecting the USB interface being connected to the first electronic device, send a command of obtaining the descriptors to the first electronic device through the USB interface.

In one exemplary embodiment of the present disclosure, with respect to one of the functions, a corresponding descriptor may include some or all of the following information: a device descriptor, a configuration descriptor, an interface descriptor and an endpoint descriptor.

In one exemplary embodiment of the present disclosure, the first receiving module 401 is further configured to, after detecting the USB interface being connected to the first electronic device, receive the descriptors corresponding to the functions of peripheral devices through the USB interface if the first electronic device is determined to be in a non-charging mode.

In one exemplary embodiment of the present disclosure, the first receiving module 401 is further configured to, after detecting the USB interface being connected to the first electronic device, if the first electronic device is determined to be in a charging mode according to mode information received from the first electronic device, skip the operation of receiving the descriptors corresponding to the functions of the first electronic device through the USB interface, and directly perform a charging operation on the first electronic device.

Figure 5:
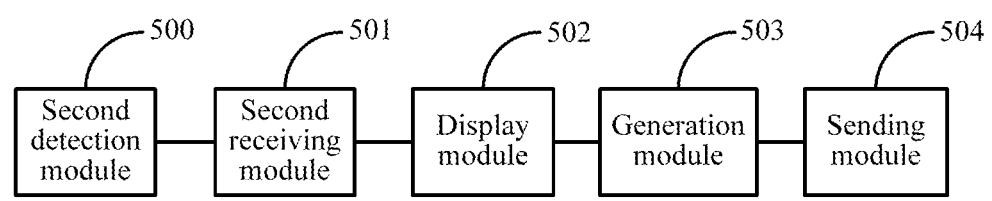
FIG. 5 schematically shows an apparatus for setting a USB interface according to one exemplary embodiment of the present disclosure.

FIG. 5 schematically shows an apparatus for setting a USB interface according to one exemplary embodiment of the present disclosure. As shown in FIG. 5, the apparatus for setting the USB interface includes:

a second detection module 500, configured to detect a connection with a control device through a USB interface;

a second receiving module 501, configured to receive a command of obtaining descriptors sent by the control device;

a display module 502, configured to, after receiving the command of obtaining the descriptors sent by the control device, display a plurality of functions each corresponding to one virtual port of a plurality of virtual ports;

a generation module 503, configured to generate a corresponding descriptor according to a USB driver corresponding to each of the functions selected by a user; and a sending module 504, configured to send the generated descriptors to the control device through the USB interface.

In one exemplary embodiment of the present disclosure, the second receiving module 501 is further configured to, after the first electronic device detects the connection with the control device through the USB interface, determine corresponding mode information according to a mode selected by the user, and send the determined mode information to the control device, where the mode information is configured to indicate whether the first electronic device is in a non-charging mode.

Figure 6:
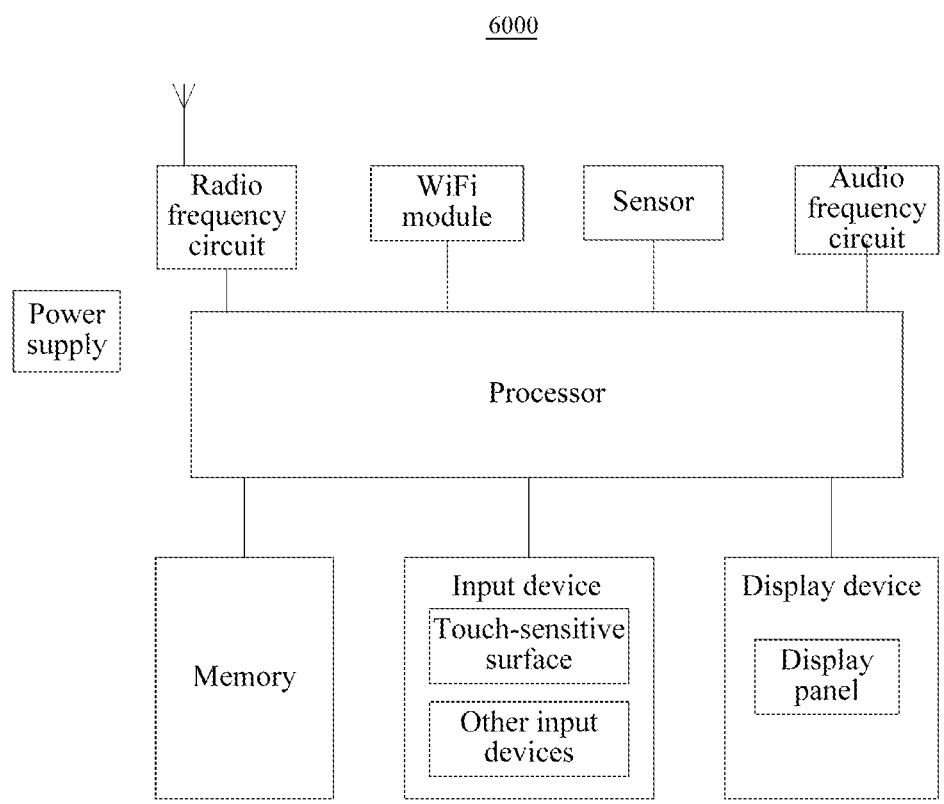
FIG. 6 schematically shows an electronic device according to one exemplary embodiment of the present disclosure.

FIG. 6 schematically shows an electronic device according to one exemplary embodiment of the present disclosure. As shown in FIG. 6, the electronic device 6000 may be various handheld devices (e.g., for example, a mobile phone, a tablet computer, a personal digital assistant (PDA), and the like), which may include a processor having one or more processing cores, a radio frequency (RF) circuit, a memory including one or more non-transitory computer-readable storage media, an input device, a display device, a sensor, an audio frequency circuit, a WiFi module, a power supply and other components. A person skilled in the art may understand that the structure of the structure of the electronic device 6000 as shown in this exemplary embodiment does not constitute any limitation. In certain exemplary embodiments, the electronic device 6000 may include more or less components, or some components may be combined, or the components may be arranged differently.

The RF circuit may be used for is used for receiving and sending signals when information is received and sent or during a call process. Specifically, downlink information of a base station is processed by one or more processors for processing after being received. In addition, uplink data may be sent to the base station. Usually, the RF circuit includes, but is not limited to, an antenna, at least one amplifier, a tuner, one or more oscillators, a subscriber identity module (SIM) card, a transceiver, a coupler, a low noise amplifier (LNA), a duplexer, and the like. Further, the radio frequency circuit may communicate with other devices through radio communications and networks. The radio communications may use any communications standard or protocol, including but not limited to Global System for Mobile Communication (GSM), General Packet Radio Service (GPRS), Code Division Multiple Access (CDMA), Wideband Code Division Multiple Access (WCDMA), Long Term Evolution (LTE), an e-mail, a short message service (SMS), and the like.

The memory may be used to store one or more software programs and modules. The processor may be used to run the software programs and modules stored in the memory, thus performing execution of the applications with various functions and processing data. In certain exemplary embodiments, the memory may mainly include a program storage area and a data storage area, where the program storage area may store an operating system, an application (for example, sound playing function, image display function, and the like) that is needed by at least one function, and the like; and the data storage area may store data (for example, audio data, phone book, and the like) created according to the use of the electronic device 6000. In addition, the memory may include a high-speed random access memory (RAM), and may further include a nonvolatile memory, for example, at least one disk storage device, a flash memory, or other volatile solid-state storage devices. Correspondingly, the memory may also include a memory controller to control access to the memory by the processor and the input device.

The input device may be used for receiving input digital or character information, and generating input signals that may be related to user settings and function control, such as a keyboard input signal, a mouse input signal, a joystick input signal, an optic input signal, or a trackball input signal. Specifically, the input device may include a touch-sensitive surface, and other input devices. The touch-sensitive surface, also referred to as a touch screen or a touchpad, may collect touch operations performed by a user on or near the touch-sensitive surface (for example, operations performed on or near the touch-sensitive surface by a user using any proper object or accessory, such as a finger, a stylus, and the like), and drive a corresponding connected apparatus according to a preset program. Optionally, the touch-sensitive surface may include two parts, including a touch detection apparatus and a touch controller. The touch detection apparatus is configured to detect a location of a touch performed by a user, to generate a signal caused by the touch operation, and to transmit the signal to the touch controller. The touch controller is configured to receive touch information in the signal from the touch detection apparatus, to convert the touch information into a touch point coordinate, and to send the touch point coordinate to the processor. The touch controller may also receive and execute a command sent by the processor. In addition, the touch-sensitive surface may be implemented in multiple types, such as a resistive type, a capacitive type, an infrared type, and a surface acoustic wave type. In addition to the touch-sensitive surface, the input device may further include other input devices. Specifically, the other input devices may include, without being not limited to, one or more of a physical keyboard, a function key (for example, a volume control key, an on/off key, and the like), a trackball, a mouse, and a joystick.

The display device may be used for displaying information input by the user or information provided for the user, and various graphic user interfaces of the electronic device 6000. These graphic user interfaces may be formed by images, texts, icons, videos, and any combination thereof. The display device may include a display panel. Optionally, the display panel may be configured by using a liquid crystal display (LCD), an organic light-emitting diode (OLED), and the like. Further, the touch-sensitive surface may cover the display panel, and after detecting a touch operation on or near the touch-sensitive surface, the touch-sensitive surface may send a touch event to the processor so that the processor determines the type of the touch event. Then, the processor provides a corresponding display output on the display panel according to the type of the touch event. In certain exemplary embodiments, the touch-sensitive surface and the display panel are configured to respectively implement the input and output functions as two independent components. Alternatively, in certain exemplary embodiments, the touch-sensitive surface and the display panel may be integrated as one component to implement the input and output functions.

The electronic device 6000 may further include at least one sensor, for example, an optical sensor, a motion sensor, and other sensors. Specifically, the optical sensor may include an ambient light sensor and a proximity sensor, where the ambient light sensor may adjust the brightness of the display panel according to the luminance of the ambient light, and the proximity sensor may turn off the display panel and/or a backlight when the electronic device 6000 is moved to the ear. A gravitational acceleration sensor, which is one type of the motion sensors, may detect the magnitude of an acceleration in each direction (usually in three axes), and may detect the magnitude and direction of the gravity in a static state. Thus, it may be used for an application recognizing an attitude of a mobile phone (for example, landscape/portrait switch, a related game, and magnetometer attitude calibration), and vibration identification related functions (for example, pedometer and knock), and the like. The electronic device 6000 may include other types of sensors, such as a gyroscope, a barometer, a hygrometer, a thermometer, and an infrared sensor, which are not elaborated herein.

The audio frequency circuit, a loudspeaker, and a microphone may provide an audio interface between the user and the electronic device 6000. The audio frequency circuit may transmit an electrical signal converted from received audio data to the loudspeaker, and the loudspeaker converts the electrical signal into a sound signal and outputs the sound signal. On the other hand, the microphone converts a collected sound signal into an electrical signal, and the audio frequency circuit receives and converts the electrical signal into audio data. After the audio data is sent to and processed by the processor, the processed audio data is sent by the radio frequency circuit to, for example, another apparatus, or is output to the memory for further processing. The audio frequency circuit may further include an earplug jack to provide communications between a peripheral earphone and the electronic device 6000.

WiFi belongs to a short-distance radio transmission technology. By means of the WiFi module, the electronic device 6000 may assist a user to receive or send an e-mail, browse a webpage, access streaming media, and the like. The WiFi module provides a wireless broadband internet access for the user. Although the WiFi module is provided in this exemplary embodiment, it can be understood that the WiFi module is not a mandatory component of the mobile terminal device 11, and may be omitted based on the need without changing the essence of the present disclosure.

The processor is a control component of the electronic device 6000, which is connected to all other components through various interfaces and circuits. The processor is configured to run or execute the software programs and/or modules stored in the memory and to retrieve the data stored in the memory to perform execution of various functions and data processing, so as to perform overall monitoring of the mobile phone. Optionally, the processor may include one or more processing cores. In certain exemplary embodiments, the processor integrates an application processor and a modem processor, where the application processor mainly processes an operating system, a user interface, an application, and the like, and the modem processor mainly processes radio communication. It can be understood that the modem processor may not necessarily be integrated in the processor.

The electronic device 6000 further includes a power supply (for example, a battery) to provide power to each component. In certain exemplary embodiments, the power supply may be logically connected to the processor through a power supply management system, so that functions such as charging, discharging, and power management are implemented by the power supply management system. The power supply may further include any other component such as one or more direct current or alternating current power supplies, a recharging system, a power supply fault detection circuit, a power supply converter or inverter, and a power status indicator.

Although not explicitly shown, the electronic device 6000 may further include a camera, a Bluetooth module, and the like, which is not elaborated herein. Specifically, in this exemplary embodiment, the display device of the electronic device 6000 is a touch screen display, and the electronic device 6000 further includes a memory, and one or more programs, where the one or more programs are stored in the memory, and are configured to be executed by one or more processors.

As described above, in certain exemplary embodiments of the present disclosure, a control device detects that a USB interface is connected to a first electronic device, where the USB interface of the first electronic device has a plurality of virtual ports. Then the control device receives descriptors corresponding to functions of the first electronic device through the USB interface. Then the control device matches each of the descriptors corresponding to each of the functions with one of a plurality of driver files corresponding to each of the functions, and after the matching is successful, determines a virtual function device corresponding to execution of each of the functions. In response to receiving an operating command for executing one of the functions, the control device sends the operating command to the corresponding virtual function device to the function to be executed through a driver interface corresponding to the function to be executed, such that the corresponding virtual function device to the function to be executed is operated on the electronic device.

In one exemplary embodiment of the present disclosure, after the first electronic device is connected to the control device through the USB interface, the first electronic device receives a command of obtaining descriptors sent by the control device. After receiving the command of obtaining the descriptors sent by the control device, the first electronic device displays a plurality of functions each corresponding to one of a plurality of virtual ports. Then the first electronic device generates each of the corresponding descriptors according to a corresponding USB driver to each of the functions selected by a user. Then the first electronic device sends the generated descriptors to the control device through the USB interface.

In certain exemplary embodiments, due to increasing the virtual ports of the USB interface of the first electronic device in such a technical solution, the control device may obtain descriptors corresponding to at least one function, allowing implementation for the control device to operate at least one function of peripheral devices, thereby solving the problem in which a PC may operate only one function of a mobile phone through a USB interface.

A person skilled in the art may understand that, the exemplary embodiments of the present disclosure may be implemented as methods, systems or computer program products. Therefore, the present disclosure may be implemented in different embodiments to be in the form of entire hardware, entire software and/or a combination of software and hardware components. Moreover, the present disclosure may be implemented in the form of computer program products stored in one or more computer available storage media (including, but not limited to, a disk memory, a CD-ROM, an optical memory, etc.), which includes computer executable program codes.

The present disclosure has been described with reference to the flowcharts and/or block diagrams of the methods, the devices (systems) and the computer program products according to the exemplary embodiments. It should be understood that each process and/or block in the flowcharts and/or the block diagrams, and a combination of processes and/or blocks in the flowcharts and/or the block diagrams, may be implemented by computer program instructions. The computer program instructions may be provided to a processor of a general-purpose computer, a special-purpose computer, an embedded processor or other programmable data processing devices to produce a machine, so as to generate an apparatus used for implementing functions specified in one or more processes of the flowcharts and/or one or more blocks in the block diagrams through instructions executed by the processor of a computer or other programmable data processing devices.

The computer program instructions may also be stored in a non-transitory computer-readable memory which can direct the computer or other programmable data processing devices to operate in a particular manner, such that the instructions stored in the non-transitory computer-readable memory produce an article of manufacture including instruction means, where the instruction means implements functions specified in one or more processes of the flowcharts and/or one or more blocks in the block diagrams.

The computer program instructions may also be loaded onto the computer or other programmable data processing devices, so as to execute a series of operations on the computer or other programmable devices to generate processing implemented by the computer, so that the instructions executed on the computer or other programmable devices provide operations for implementing functions specified in one or more processes of the flowcharts and/or one or more blocks in the block diagrams.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The exemplary embodiments were chosen and described in order to explain the principles of the disclosure and their practical application so as to activate others skilled in the art to utilize the disclosure and various exemplary embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:
1. A method, comprising:
processing, by a controller, a plurality of descriptors received from an electronic device communicatively coupled with the controller, wherein each descriptor of the plurality of descriptors corresponds to a function of a plurality of functions of the electronic device, and the processing comprises:
determining a virtual function device corresponding to execution of at least one function of the plurality of functions based on a successful matching of one or more of the received descriptors with one or more driver files corresponding to at least one function of the plurality of functions; and communicating an operating command to the virtual function device corresponding to execution of the at least one function based on an indication that the at least one function is to be executed, wherein the operating command causes the virtual function device corresponding to execution of the at least one function to be operated on the electronic device, two or more functions of the plurality of functions associated with different resources of the electronic device are selectable for execution, a first function and a second function of the plurality of functions are associated with a first resource of the electronic device, a third function of the plurality of functions is associated with a second resource of the electronic device different from the first resource, and the method further comprises:

identifying at least one of the first function or the second function to be executed based on a first indication; and identifying the third function to be executed based on a second indication different from the first indication, and one or more of the first indication is based on a detected interaction with a first interface configured to prevent both of the first function and the second function from being selected to be executed; or the second indication is based on a detected interaction with a second interface configured to allow the third function to be selectable for execution at a same time that the first function or the second function is selected for execution.

2. The method according to claim 1, wherein the first function is a media transfer protocol (MTP) function, the second function is a picture transfer protocol (PTP) function, and the third function is an Android Development Bridge (ADB) function.

3. The method according to claim 1, wherein the plurality of descriptors is received from the electronic device based on a detection that the electronic device is communicatively coupled with the controller by way of a Universal Serial Bus (USB) interface.

4. The method according to claim 3, wherein the operating command is communicated to the virtual function device corresponding to the at least one function to be executed through a corresponding virtual interface of a plurality of virtual interfaces of the USB interface.

5. The method according to claim 1, further comprising:
detecting, by the controller, whether the electronic device is communicatively coupled with the electronic device;
detecting, by the controller, whether the electronic device is in a charging mode or a non-charging mode based on mode information received from the electronic device; and
communicating a descriptor reception command to the electronic device based on a determination that the electronic device is in the non-charging mode.

6. An apparatus, comprising:
a processor; and
a non-transitory computer readable medium having computer-executable program code stored thereon that, when executed by the processor, causes the apparatus to:

process a plurality of descriptors received from an electronic device communicatively coupled with the apparatus, wherein each descriptor of the plurality of descriptors corresponds to a function of a plurality of functions of the electronic device, and the processing comprises:

determining a virtual function device corresponding to execution of at least one function of the plurality of functions based on a successful matching of one or more of the received descriptors with one or more driver files corresponding to at least one function of the plurality of functions; and communicate an operating command to the virtual function device corresponding to execution of the at least one function based on an indication that the at least one function is to be executed, wherein the operating command causes the virtual function device corresponding to execution of the at least one function to be operated on the electronic device, and two or more functions of the plurality of functions associated with different resources of the electronic device are selectable for execution, a first function and a second function of the plurality of functions are associated with a first resource of the electronic device, a third function of the plurality of functions is associated with a second resource of the electronic device different from the first resource, and the apparatus is further caused to:

identify at least one of the first function or the second function to be executed based on a first indication; and identify the third function to be executed based on a second indication different from the first indication, and one or more of the first indication is based on a detected interaction with a first interface configured to prevent both of the first function and the second function from being selected to be executed; or the second indication is based on a detected interaction with a second interface configured to allow the third function to be selectable for execution at a same time that the first function or the second function is selected for execution.

7. The apparatus according to claim 6, wherein the first function is a media transfer protocol (MTP) function, the second function is a picture transfer protocol (PTP) function, and the third function is an Android Development Bridge (ADB) function.

8. The apparatus according to claim 6, wherein the plurality of descriptors is received from the electronic device based on a detection that the electronic device is communicatively coupled with the apparatus by way of a Universal Serial Bus (USB) interface.

9. The apparatus according to claim 8, wherein the operating command is communicated to the virtual function device corresponding to the at least one function to be executed through a corresponding virtual interface of a plurality of virtual interfaces of the USB interface.

10. The apparatus according to claim 6, wherein the apparatus is further caused to:
detect whether the electronic device is communicatively coupled with the electronic device;
detect whether the electronic device is in a charging mode or a non-charging mode based on mode information received from the electronic device; and communicate a descriptor reception command to the electronic device based on a determination that the electronic device is in the non-charging mode.

11. A method, comprising:
  displaying, by an electronic device, a plurality of functions of the electronic device, the displaying being based on a determination that the electronic device is communicatively coupled with a controller, at least one function of the plurality of functions corresponds to one virtual interface of a plurality of virtual interfaces, a first function and a second function of the plurality of functions are associated with a first resource of the electronic device, and a third function of the plurality of functions is associated with a second resource of the electronic device different from the first resource;
  communicating a plurality of descriptors to the controller, wherein each descriptor of the plurality of descriptors corresponds to a function of the plurality of functions of the electronic device;
  identifying at least one of the first function or the second function to be executed based on a first indication; and
  identifying the third function to be executed based on a second indication different from the first indication,
  wherein one or more of
    the first indication is based on a detected interaction with a first interface configured to prevent both of the first function and the second function from being selected to be executed, or
    the second indication is based on a detected interaction with a second interface configured to allow the third function to be selectable for execution at a same time that the first function or the second function is selected for execution.

12. The method according to claim 11, wherein the first function is a media transfer protocol (MTP) function, the second function is a picture transfer protocol (PTP) function, and the third function is an Android Development Bridge (ADB) function.

* * * * *